United States Patent

[11] 3,575,363

| [72] | Inventors | Robert B. Jenny<br>Kirkwood;<br>Duane O. Carpenter; James W. Agnew,<br>Florissant; Lloyd R. Novak, St Louis;<br>Vincent H. Zimmermann, Olivette, Mo. |
|---|---|---|
| [21] | Appl. No. | 853,670 |
| [22] | Filed | Aug. 28, 1969 |
| [45] | Patented | Apr. 20, 1971 |
| [73] | Assignee | McDonnell Douglas Corporation<br>St. Louis, Mo. |

[54] HORIZONTAL TAIL FOR AIRCRAFT
17 Claims, 5 Drawing Figs.

[52] U.S. Cl. ............................................ 244/13,
244/42, 244/43, 244/87
[51] Int. Cl. ............................................ B64c 9/12
[50] Field of Search .................................. 244/13, 42,
42.43, 42.6, 42.61, 42.62, 43, 87, 89

[56] References Cited
UNITED STATES PATENTS

| 2,045,638 | 6/1936 | Dormoy | 244/42 |
| 2,661,170 | 12/1953 | Chamberlin | 244/87 |
| 3,285,540 | 11/1956 | Lee | 244/43 |
| 3,363,862 | 1/1968 | Walter et al. | 244/87X |

FOREIGN PATENTS

| 526,775 | 9/1940 | Great Britain | 244/87 |
| 978,969 | 4/1951 | France | 244/87 |

Primary Examiner—Milton Buchler
Assistant Examiner—Carl A. Rutledge
Attorney—Charles B. Haverstock ABSTRACT: A horizontal control surface for an aircraft which can be rotated about an axis perpendicular to the longitudinal axis of the aircraft to provide pitch maneuver control. The control surface includes inverted "high lift" devices such as leading edge slats and slotted flaps which can be extended by suitable means to increase the aerodynamic forces which can be generated thereby for pitch control of the aircraft.

Patented April 20, 1971  3,575,363

Patented April 20, 1971
3,575,363
3 Sheets-Sheet 3
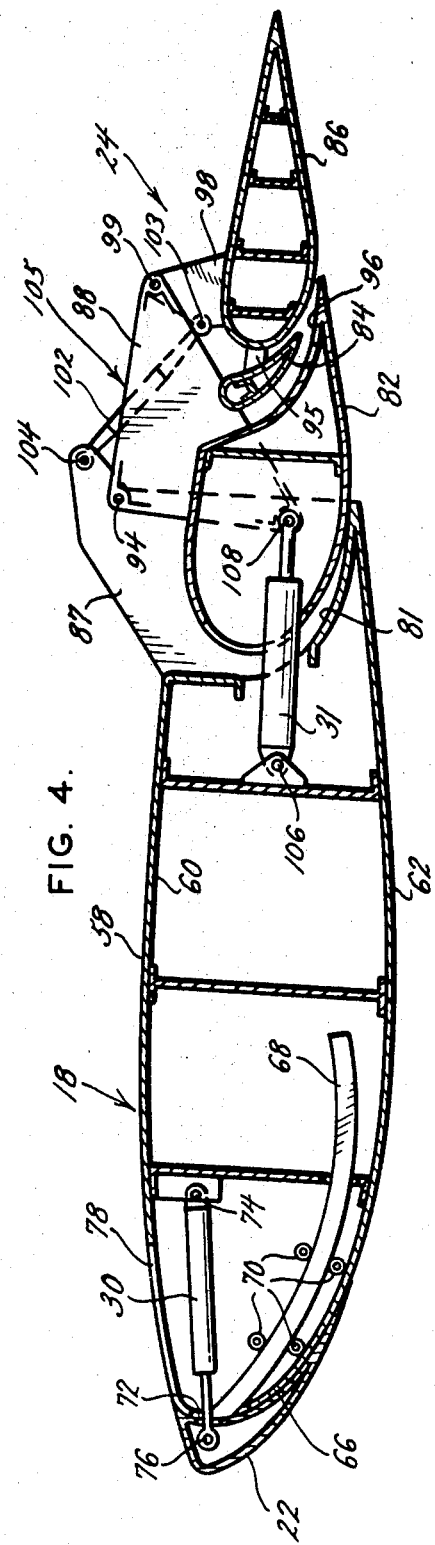
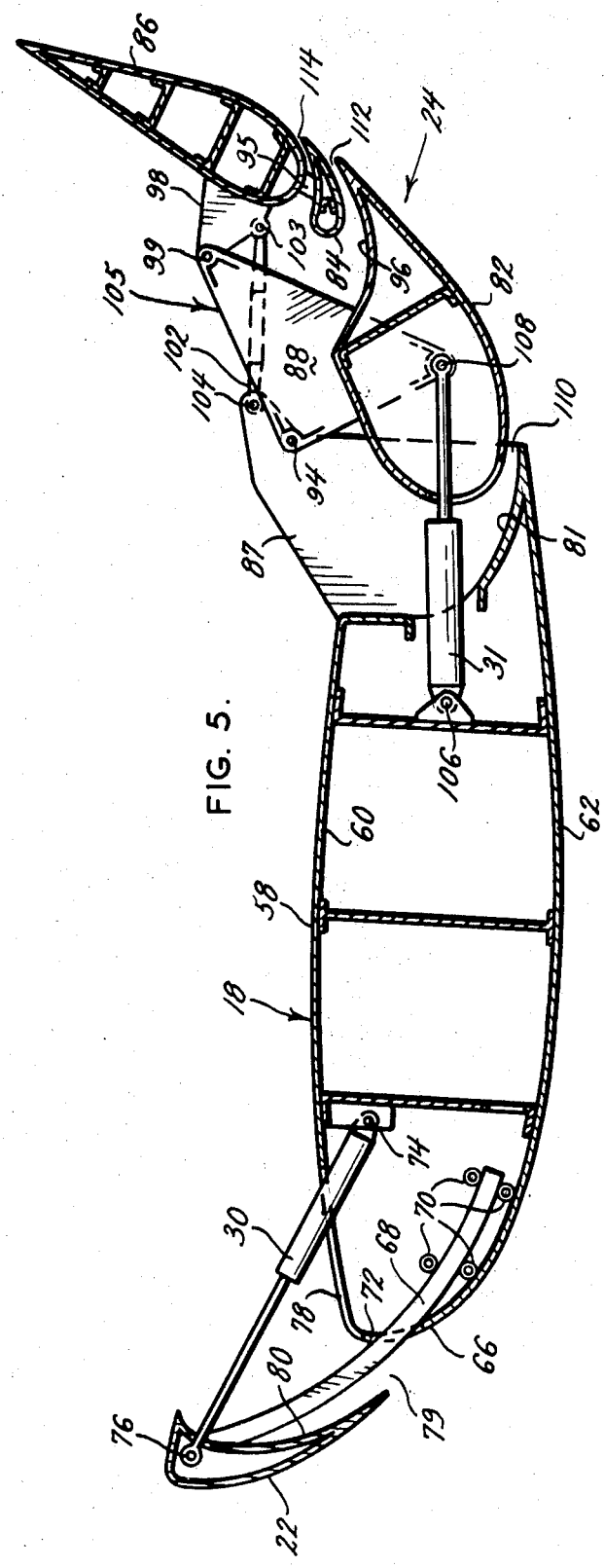

HORIZONTAL TAIL FOR AIRCRAFT

The design of a horizontal tail for an aircraft has usually presented a compromise problem to the aircraft designer. For example, a horizontal tail must usually provide static and dynamic longitudinal stability for the aircraft over a wide range of flight conditions including different speeds and different positions of the center of gravity of the aircraft. At the same time it is usually desirable to build the tail assembly as small as possible to reduce its undesirable parasitic drag which in turn makes the aircraft more efficient. It is also important to make the tail assembly strong because of the widely varying loads that are applied thereto during flight, and yet it should be made as light as possible so that the supporting structure can also be made lighter and so the maneuverability of the aircraft is not adversely affected by the momentum of heavy components at the extremities thereof. One of the most difficult problems is designing a horizontal tail assembly which can aerodynamically generate enough downward force at the aft end of the fuselage to rotate the wing to its maximum unstalled angle of attack while the aircraft is in its landing configuration with the center of gravity of the aircraft in its most forward position. The generation of sufficient downward tail force during landing is especially troublesome and at the same time very important in short takeoff and landing (STOL) aircraft. The high lift required for such aircraft at low airspeeds is usually obtained through the use of "high lift" devices such as slotted flaps and leading edge slats on the wings. Such devices tend to generate, in addition to lift, high nose down pitching moments which must be counteracted by downward tail forces for statically stabilized flight. The tail must be able to generate this downward force plus enough extra force to enable maneuvering at the low airspeeds involved. Heretofore, horizontal flying tails or stabilators which can rotate as a unit in response to trim and/or maneuver commands have been utilized in applications such as those mentioned above. This is because substantially all of such horizontal tails can be used to generate the required down thrust rather than only a portion thereof as is the case with more conventional fixed horizontal stabilizer and elevator combinations. It has been found, however, that these known flying tail arrangements still must be undesirably large and therefore heavy and aerodynamically dirty to be able to provide the amount of downward forces required by STOL aircraft especially at relatively low airspeeds. It has also been found that since the required forces generated by the tail vary widely for different flight conditions, such known tails must be able to be rotated through relatively great incidence angles with respect to the wing of the aircraft to maintain sufficient control during all portions of the flight. This requirement for large angles of rotation plus large surface areas not only introduces structural problems in the design and construction of such horizontal flying tails but in some cases has caused aerodynamic problems such as the tail undesirably stalling before the wing stalls.

These and other shortcomings and disadvantages of the prior art are overcome by the present invention which teaches the construction and operation of a horizontal flying tail which utilizes inverted "high lift" devices such as leading edge slats and slotted flaps to increase the downward thrust that can be generated by the flying tail at relatively low air speeds thus allowing a reduction in the overall size of the flying horizontal tail that must be used for a given aircraft. Although the present invention is particularly useful on STOL type aircraft it can also be used on other types of aircraft including high speed aircraft such as those having variable geometry wings. Such high speed aircraft have widely varying requirements for pitch control and stabilizing forces, and tail assemblies constructed according to the present invention allow the size of the horizontal control surfaces for such aircraft to be reduced to a minimum thereby also reducing to a minimum the undesirable parasitic drag created thereby.

It is therefore a principal object of the present invention to provide an improved horizontal tail assembly for aircraft.

Another object is to provide a horizontal flying tail for aircraft which can be used to provide relatively greater pitch control and stabilizing forces than conventional horizontal tails.

Another object is to reduce the size of horizontal flying tails required by aircraft.

Another object is to provide a horizontal flying tail which can be made to operate at relatively high angles of attack and not stall.

Another object is to provide a horizontal flying tail which can generate large nose up pitching forces during a selected portion of an aircraft's flight envelope and yet present minimum drag during other portions of the flight envelope.

Another object of the present invention is to provide means for selectively increasing the drag of an aircraft so the aircraft can make relatively steep descents even at relatively low airspeeds.

Another object of the present invention is to provide a horizontal tail assembly which provides variable pitch controlling and stabilizing forces through a wide range of angles of attack and airspeeds.

Another object is to provide a stabilator that is particularly useful at relatively low airspeeds.

These and other objects and advantages of the present invention will become apparent after considering the following detailed specification which covers a preferred embodiment thereof in conjunction with the accompanying drawings, wherein:

FIG. 4 is an enlarged cross-sectional view taken on line 4-4 of FIG. 2, showing mechanism for extending and retracting the slats and flaps thereof, the slats and flaps being shown in their retracted positions;

FIG. 5 is an enlarged cross-sectional view similar to FIG. 4 but with the slats and flaps shown in extended positions.

Figure 1:
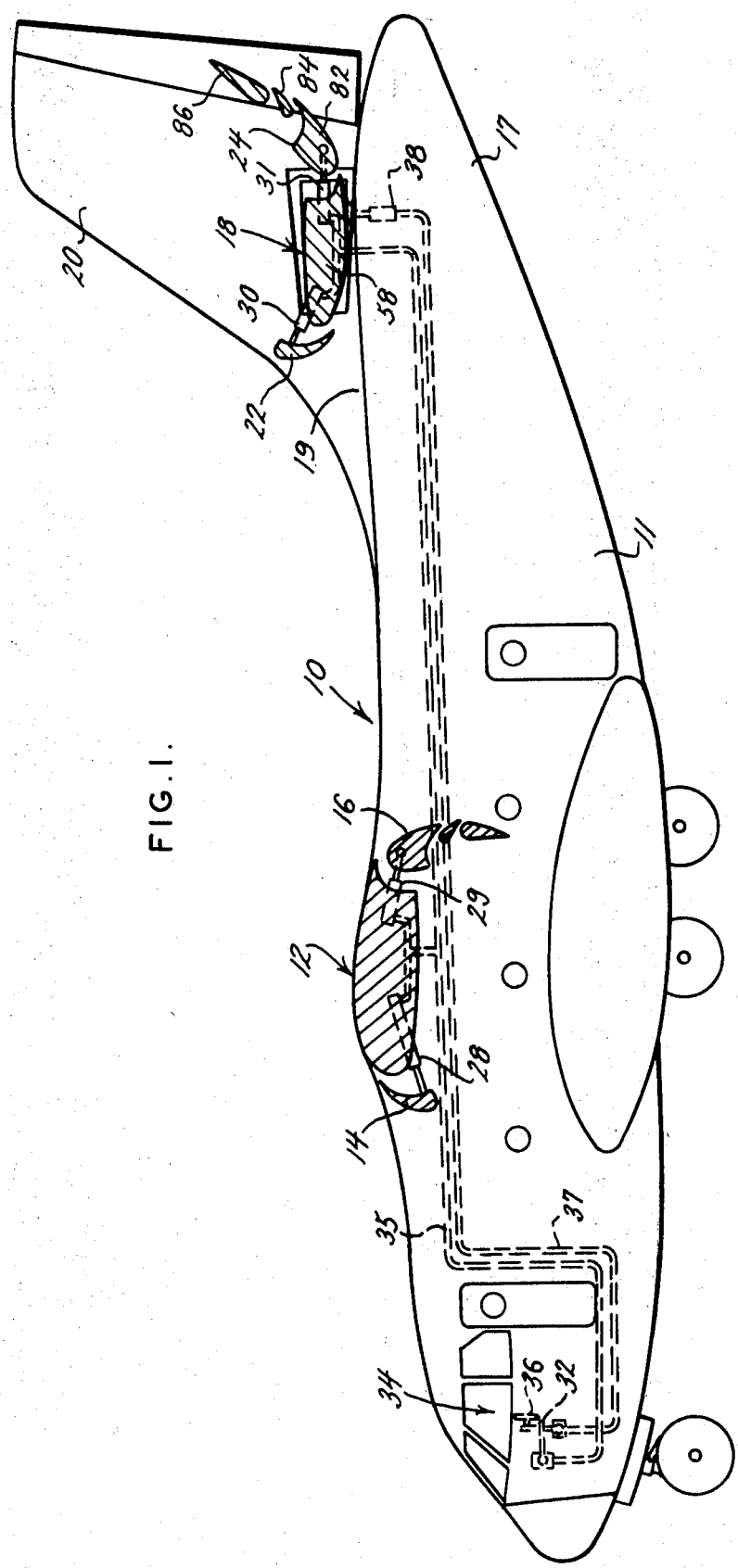
FIG. 1 is a side elevational view of an STOL airplane provided with a horizontal tail assembly constructed according to the teachings of the present invention, certain parts being shown cutaway to appear in cross section.

Referring to the drawings more particularly by reference numbers, number 10 in FIG. 1 refers to an aircraft, such as an STOL aircraft, having a tail assembly constructed according to the present invention. THe aircraft 10 includes a fuselage 11, and a wing 12 having high lift devices installed thereon, which devices are shown for illustrative purposes as including leading edge slats 14 and a triple slotted trailing edge flap assembly 16. In the drawing, the slats and flap assembly are shown in their extended positions. These high lift devices allow the wing 12 to generate large amounts of lifting force per unit of wing area which in turn allows the aircraft 10 to fly at slower airspeeds than can similar aircraft having more conventional wings. The high lift devices 14 and 16, when extended in flight as shown, tend to generate large nose down pitching moments, and these moments must be counteracted in order to achieve stable flight conditions. The nose down pitching moments that are produced are usually matched by nose-up pitching moments generated by downward tail forces that act through the moment arm which extends from the aft end 17 of the fuselage 11 to the aircraft's center of moments. In the present case these downward forces are generated by a horizontal flying tail assembly 18 which is shown mounted at the aft end 17 of the fuselage 11 adjacent to the root 19 of the vertical stabilizer 20. The tail assembly 18 has portions which extend sidewardly from both sides of the fuselage 11.

The horizontal flying tail assembly 18 of the present invention includes high lift devices including leading edge slats 22 and slotted trailing edge flaps 24 which are mounted thereon in an inverted manner from similar devices on more conventional wing structures so that a greater amount of downward force or lift can be generated for a given size tail assembly 18. The leading edge slats 22 can be aerodynamically or controllably extended and retracted as will be explained or they can be fixed in some desired extended position. The latter fixed type, however, will generate an increased and possibly excessive amount of the drag when the aircraft is not in a landing or takeoff configuration, and therefore the fixed construction may be less desirable than the movable construction. The flaps 24 can be controllably extendible either in conjunction with the slats 22 or separately. As shown in FIG. 1, the high lift devices 14 and 16 for the wing and the inverted high lift devices 22 and 24 for the horizontal tail assembly 18 are controllably retractable and extendible together by means such as actuators 28 and 29 in the wing 12 and actuators 30 and 31 in the tail 18. The actuators are all shown as hydraulic actuators operatively connected to a flap control 32 located in the cockpit 34 of the aircraft 10 by suitable means such as by hydraulic lines 35. The operative coupling of the wing high lift devices 14 and 16 with the tail high lift devices 22 and 24 has the advantage of reducing the number of operations required by the pilot. This is generally desirable since the requirement for utilization of the high lift devices 22 and 24, usually coincides with the extension of the wing devices 14 and 16 for takeoff and landing, and it is at these times a pilot is usually the busiest.

Also shown in the cockpit 34 is an elevator control 36 which is connected through another hydraulic line 37 to a stabilator actuator 38. The stabilator actuator 38 is connected between the fuselage 11 of the aircraft 10 and the tail assembly 18 and provides means to pivot the entire tail assembly 18 about a horizontal pivot axis to thereby vary its angle of incidence with respect to the wing 12 and in response to maneuver and/or trim commands at the elevator control 36.

Figure 3:
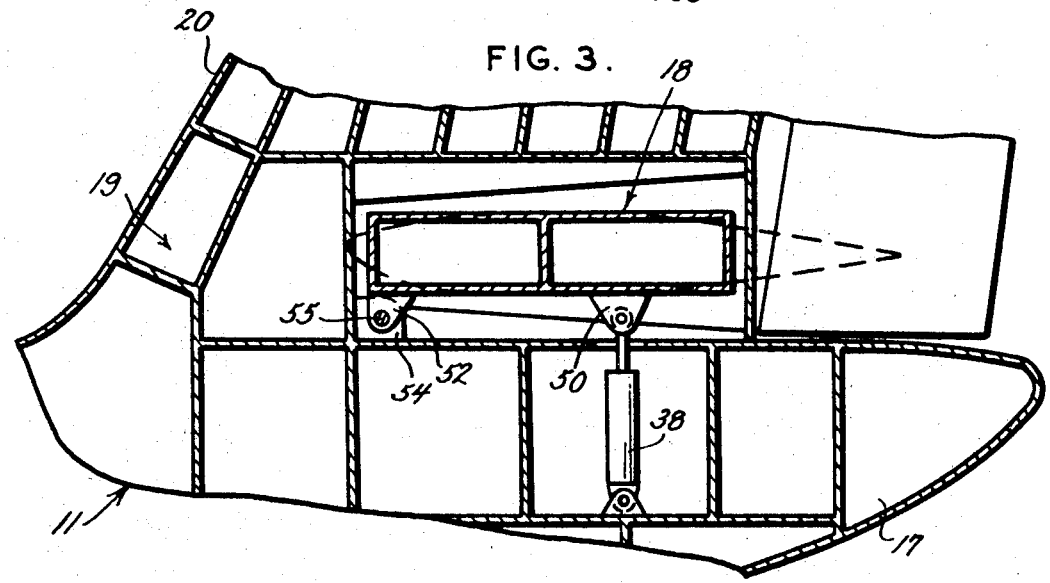
FIG. 3 is a cross-sectional view taken on line 3-3 of FIG. 2.

The operation of the stabilator actuator 38 can be more clearly seen in FIG. 3 which shows the actuator 38 pivotally connected between the aft end 17 of the fuselage 11 and a control horn or bracket 50 on the tail 18. The tail assembly 18 is pivotally mounted to the aircraft fuselage 11 by means such as flanges 52 which extend downwardly from the underside of the tail assembly 18, and a clevis 54 connected to the fuselage 11. The pivotal means including the flanges 52 and the clevis 54 are streamlined within the root 19 of the vertical stabilizer 20. The horizontal tail 18 is rotated about the clevis shaft 55 to any desired angular relationship by the actuator 38 in response to maneuvering and/or trim commands from the elevator control 36 in the cockpit 34. It should be understood that many suitable locations and methods for mounting and moving horizontal flying tails are known in the art, and therefore the particular embodiment disclosed is only illustrative of one of many possible ways to mount this and other horizontal flying tails.

FIGS. 4 and 5 show the structural details of an embodiment of the subject horizontal flying details of an embodiment of the subject horizontal flying tail assembly 18, which includes the aforementioned inverted slats 22 and flap assembly 24. The horizontal flying tail assembly 18 includes a main body portion 58 having cambered upper and lower skins 60 and 62, respectively. The camber of the lower skin 62 is shown greater than the camber of the upper skin 60 so that even at zero or slightly positive angles of attack, some downward acting pitch stabilizing forces will be generated thereby. The different cambers of the skins 60 and 62 also enable the tail 18 to generate increased downward forces as will be discussed hereinafter.

Figure 2:
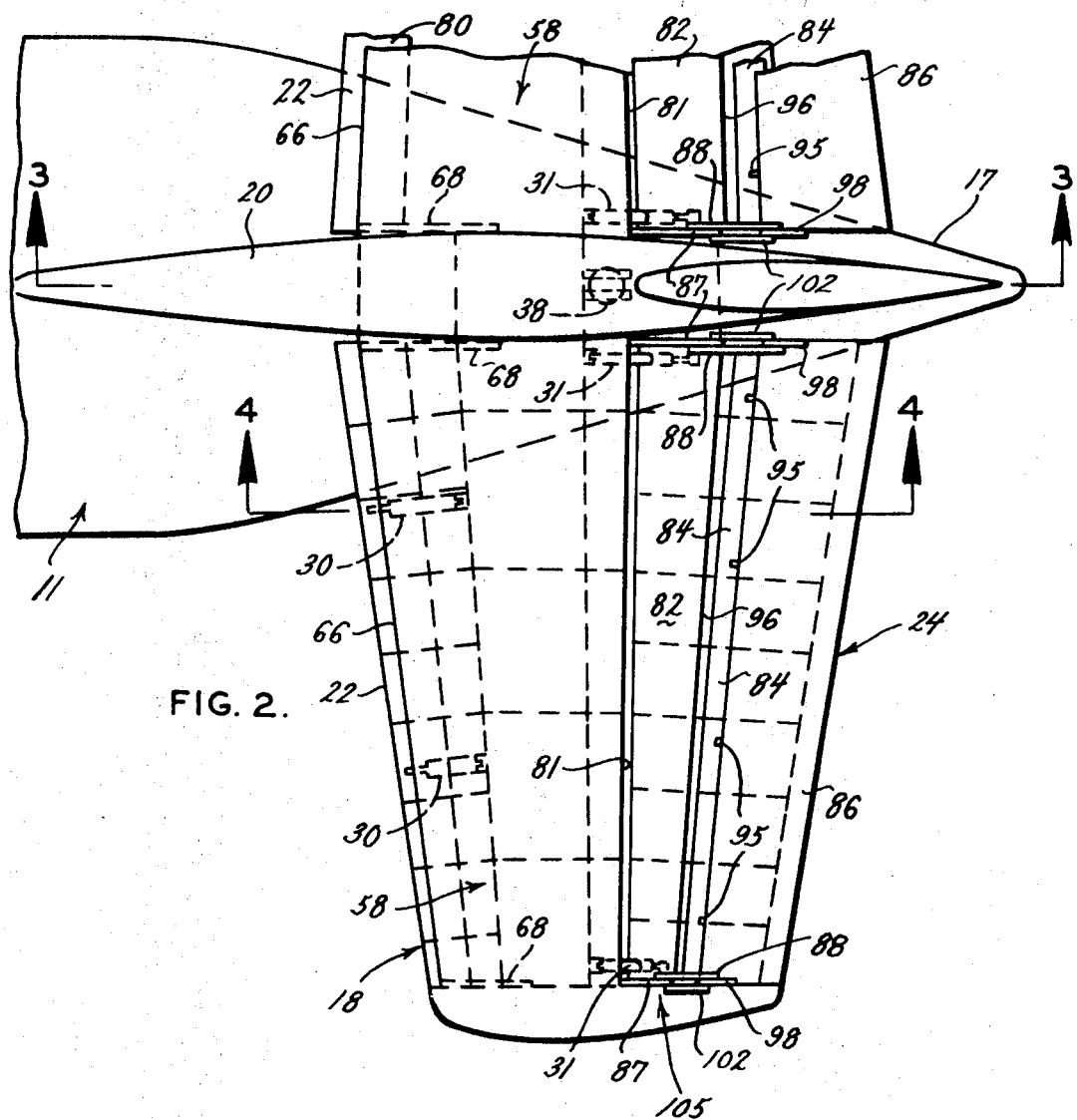
FIG. 2 is an enlarged fragmentary top view of the tail assembly of the aircraft shown in FIG. 1.

The sectional views shown in FIGS. 4 and 5 have been taken at locations on the tail assembly to illustrate the more important components thereof. It is to be understood, however, that some of the components shown, including particularly the movable components, may be duplicated one or more times in the two horizontal sidewardly extending portions of the tail assembly depending on the forces encountered and the forces necessary to move the movable members. For example, each side portion of the tail assembly of FIG. 2 is shown having two hydraulic actuators 30 and two hydraulic actuators 31 and associated linkages. However, in the description that follows only one of each component will be discussed in order to simplify the description.

The inverted slat 22 is shown mounted adjacent to the leading edge 66 of the main body portion 58. The slat 22 is extendible and retractable relative to the body portion 58 by means of a curved movable cam member 68 which is shown fixedly attached to the slat 22 at one end and which is slidably mounted for movement between opposed sets of spaced supporting and guiding rollers 70. Each cam member 68 extends through a passageway 72 formed in the leading edge 66 of the body portion 58 to allow the actuator 30 to move the slat 22 from its streamlined position abutting the leading edge 66 as shown in FIG. 5. The slat 22 is also rotated slightly clockwise during extension thereof. The actuator 30 is pivotally connected at its opposite ends between support means on the body portion 58 and the slat 22 by pivots 74 and 76 respectively. Another slot or opening 78 is provided in the leading edge 66 of the tail body portion 58 so that the actuator 30 can swing as required when extending and retracting the slat 22. The slat 22 can also be constructed to extend and retract automatically by means of aerodynamic forces acting thereon at different negative angles of attack.

The slat 22 as already stated is shown in its extended position in FIG. 5, and as can be seen in its extended position it defines with the body portion 58 an airduct 79 between the inner surface 80 of the slat 22 and the leading edge 66 of the body portion 58. When the horizontal flying tail assembly 18 is at the relatively high negative angles of attack required to generate high downward tail forces, the duct 79 directs high pressure air from above the tail assembly 18 to flow at relatively high velocities over the surface of the highly cambered lower skin 62. This flow of air over the lower skin surface 62 causes air which otherwise might separate therefrom and "burble," to flow smoothly over the lower skin surface 62 even at relatively high negative angles of attack. This increases the negative angle of attack at which lift or downward tail force can be generated by the horizontal tail assembly 18, and in turn increases the total downward force which can be generated at a given airspeed. As can be seen in FIG. 4, when the slat 22 is not needed it can be retracted to a closed position nestled against the leading edge 66 of the main body portion 58 to minimize the drag generated by the tail 18 and to form the normal aerodynamic leading edge of the tail assembly 18.

A flap assembly 24 is shown connected in an inverted manner adjacent to the concave trailing edge 81 of the body portion 58. The flap assembly 24 may be similar in some respects to flap assemblies such as heretofore have been used on wings of aircraft. The particular embodiment of the flap assembly 24 shown is is triple slotted Fowler type flap assembly which includes first, second and third flap members 82, 84 and 86 constructed and positioned as shown.

When the flap assembly 14 is in its retracted condition, the first or forwardmost flap member 82 nestles adjacent to the concave trailing edge 81 of the body portions 58 as shown in FIG. 4, and the other flap members 84 and 86 form more or less aerodynamic continuations thereof. The first flap member 82 is pivotally connected to a bracket member 87, which is part of the body portion 58 by means of a triangular-shaped linkage member 88 which is fixedly attached thereto. The bracket member 87 extends from the concave trailing surface 81 of the main tail body 58. A pivot connection 94 is provided between the bracket 87 and the linkage member 88 at a location shown above and behind the trailing edge 81 so that when the flap member 82 is rotated thereabout by means of the actuator 31, the flap member 82 will cant or move in a counterclockwise direction moving generally rearwardly and upwardly from its retracted position as shown in FIG. 4 to its rearwardly extended position as shown in FIG. 5.

The second and third flap members 84 and 86, as shown, are rigidly connected together by means of a strut 95, and the second and third flaps 84 and 86 in their retracted position nestle in and adjacent to the concave rear surface 96 of the first flap member 82. The flap member 86 has an upwardly extending control horn 98 whose upper extremity is pivotally connected by pivot means 99 adjacent to a different apex or location on the triangular shaped linkage member 88. A rod 102, which may be adjustable in length, pivotally connects between a pivot 103 at a lower position on the horn 98 and another pivot 104 on the bracket 87 which is shown located upwardly and rearwardly with respect to the pivot 94. The triangular linkage member 88 and the rod 102 together form a differential X-linkage 105 between the bracket 87 and the second and third flap members 84 and 86.

The actuator 31 (of which there are four in the total tail assembly) connects between a pivot 106 on the main body portion 58 and a pivot 108 on the triangular linkage member 88 at a position nearly centered horizontally between the ends of the flap member 82. When the actuator 31 is energized it either elongates or contracts causing the flap member 82 and the triangular linkage member 88 to rotate about the pivot point 94 as aforesaid. When this happens, the X-linkage 105 causes the second and third flap members 84 and 86 to move either generally upwardly and rearwardly relative to the flap member 82 and in so doing to also rotate counterclockwise therefrom or to return to their retracted positions as shown in FIG. 4.

In the extended position of the flap assembly 24, the concave trailing edge 81 of the main tail body 58 and the flap members 82, 84 and 86 define airducts or passages 110, 112 and 114 therebetween. These ducts allow the relatively high pressure air from above the tail assembly 18 to blow over the lower surfaces of the flap members 82, 84 and 86 to thereby control the boundary layer between the flaps and the adjacent relatively low pressure air stream to prevent separation to the airstream below the flaps from the flaps. This arrangement permits a relatively large deflection of the airstream generally upward from the tail assembly 18 and increases the amount of downward force which can be generated. When the flap members 82, 84 and 86 are in their retracted positions on the other hand, the ducts 110, 112 and 114 are effectively closed to air flow therethrough with its attendant drag and the tail assembly 18 acts as a more or less ordinary aerodynamic tail assembly for high speed operation.

It should be realized that although a preferred embodiment of the subject device is shown in the drawings, changes could be made including particularly providing more or fewer flap members in the flap assembly 24 without departing from the basic concepts of the invention. The choice that is made will involve a compromise between greater pitch control forces and mechanical complexity on the one side and less pitch control and mechanical simplicity on the other.

Thus there has been shown and described a preferred embodiment of a novel horizontal tail for an aircraft which fulfills all of the objects and modifications, variations, and uses and applications of the present device will become apparent to those skilled in the art after considering their specification and the accompanying drawings, all such changes, modifications, variations, and other uses and application which do not depart from the spirit and scope of the invention are deemed to be covered by the claims which follow.

We claim:

1. Horizontal stabilator means for an aircraft, said stabilator means including a body member having front and rear portions, means mounting said body portion for angular movement of the aircraft, slat means mounted adjacent to the front portion of said body member, and means for moving said slat means between a retracted position adjacent the front portion of said body member and an extended position generally upwardly and forwardly from side body member.

2. The stabilator stabilator means for an aircraft defined in claim 1 wherein said means for moving the slat means include means to predeterminately rotate said slat means with respect to said body member during movement thereof between the retracted and extended positions thereof.

3. The stabilator means for an aircraft defined in claim 1 wherein said slat means and the front portion of said body member defined an airduct therebetween when said slat means are in extended position.

4. Horizontal stabilator means for an aircraft comprising a body member having leading and trailing portions, means for mounting said body member on the aircraft for angular movement with respect thereto, a flap assembly mounted to the trailing portion of the body member, said flap assembly including at lease one flap member, and means for moving the flap member between a retracted position adjacent the trailing portion of the body member and an extended position in which the flap member is spaced generally upwardly and rearwardly relative to the trailing portion of the body member, said flap member and the trailing portion of the body member, defining an airduct therebetween when said flap member is in its extended position.

5. The stabilator means defined in claim 4 wherein said means for moving the flap member include means to predeterminately rotate said flap member relative to said body member during movements between the retracted and extended positions thereof.

6. The stabilator mean defined in claim 4 wherein said flap assembly includes at least two spaced flap members.

7. In an aircraft having elevator controls, a horizontal tail assembly including a horizontal stabilator with leading and trailing edge portions and means to predeterminately rotate the horizontal stabilator with respect to the aircraft in response to movements of the elevator controls, the improvement comprising slat means mounted extending along the leading edge portions of the horizontal stabilator in position spaced forwardly and upwardly relative to said leading edge portion, and flap means mounted extending along the trailing edge of said horizontal stabilator in position spaced rearwardly and upwardly relative to said trailing edge portion.

8. In the aircraft defined in claim 7 wherein said slat means include a slat member and means operable to move said slat member from the position spaced from the leading edge portion of said horizontal stabilator.

9. In the aircraft defined in claim 7 wherein said flap means include a flap member and means operable to move said flap member from the position spaced from the trailing edge of said horizontal stabilator to a retracted trailing edge of said horizontal stabilator to a retraced streamline position in which the flap member is adjacent the trailing edge portion of said horizontal stabilator.

10. In the aircraft defined in claim 7 wherein said flap means include a triple slotted flap assembly.

11. In the aircraft defined in claim 7 wherein said flap means include first, second and third flap members and means to move said flap members between first positions wherein said flap members extend rearwardly, upwardly and in a canted spaced relationship to the trailing edge portion of said horizontal stabilator and second positions wherein said flap members are in streamlined in-line positions extending rearwardly from adjacent the trailing edge portion of said horizontal stabilator.

12. In the aircraft defined in claim 11 wherein said second and third flap members are fixedly connected together.

13. In the aircraft defined in claim 7 wherein said horizontal stabilator is an airfoil with cambered upper and lower skins, said lower skin having a greater camber than said upper skin.

14. An STOL aircraft having elevator controls, a wing including wing flaps thereon, means to retract and extend the wing flaps, a horizontal control surface having a front and a rear, and means to change the angle of incidence of the horizontal control surface with respect to the wing in response to movement of the elevator controls, the improvement comprising an inverted flap assembly connected to the rear of the horizontal control surface, and means for extending said inverted flap assembly in coordination with extension of the wing flaps whereby nose down pitching moments produced by the extending of the wing flaps are counteracted by nose up pitching moments generated by extension of said inverted flap assembly on the control surface.

15. The STOL aircraft defined in claim 14 wherein said inverted flap assembly includes first and second airfoil members, a first airduct being formed between the rear of the horizontal control surface and the first airfoil member when said flap assembly is extended, a second airduct being formed between the first and second airfoil members in the extended position of said flap assembly, air flowing through said first and second airducts under the first and second airfoil members respectively thereby preventing airflow separation from said airfoil members.

16. The STOL aircraft defined in claim 14 including inverted slat means connected to the front of said horizontal control surface, and means to move said inverted slat means to an extended position on the horizontal control surface in coordination with extension of the wing flaps.

17. A horizontal flying tail for an aircraft including means forming retractable inverted leading edge slats and retractable inverted trailing edge slotted flaps connected thereto.

UNITED STATES PATENT OFFICE
CERTIFICATE OF CORRECTION

Patent No. 3,575,363                     Dated     April 20, 1971

Inventor(s)  Robert B. Jenny et al.

It is certified that error appears in the above-identified patent and that said Letters Patent are hereby corrected as shown below:

In the ABSTRACT; line 4, after "control" insert a period. Column 2, line 45, "THe" shoule read -- The --. Column 3, line 52, cancel "details of an embodiment of"; line 53, cancel "the subject horizontal flying". Column 4, line 14, before "Fig. insert -- Fig. 4 to its completely extended position in which extends forwardly and upwardly and is located in front of and somewhat above the leading edge 66 as shown in --. Column 5, beginning with "Thus" in line 51 cancel down to and includi "follow." in line 59, and insert -- Thus there has been shown and described a preferred embodiment of a novel horizontal ta for an aircraft which fulfills all of the objects and advanta sought therefor. Realizing that many changes, modifications variations, and other uses and applications of the present device will become apparent to those skilled in the art after considering this specification and the accompanying drawings all such changes, modifications, variations, and other uses a applications which do not depart from the spirit and scope of the invention are deemed to be covered by this invention whic is limited only by the claims which follow. --; line 64, "of" should read -- on --. Column 6, line 40, after "stabilator" a before the period (.) insert -- to a retracted streamline position in which the slat means are adjacent the leading edg portion of said horizontal stabilator. --; line 44, cancel "trailing edge of said"; line 46, cancel "horizontal stabilat to a retraced".

Signed and sealed this 7th day of September 1971

(SEAL)
Attest:

EDWARD M. FLETCHER, JR.
Attesting Officer

ROBERT GOTTSCHALK
Acting Commissioner of Patent